Figure 1:
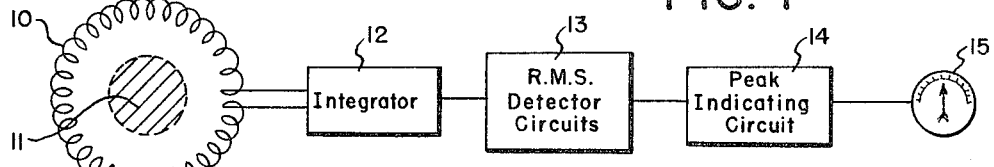

Nov. 29, 1966   H. S. FERGUSON   3,289,079
R.M.S. MEASURING SYSTEM HAVING AN INTEGRATING CIRCUIT
INCLUDING A TRANSISTORIZED CAPACITOR DISCHARGE
MEANS CONTROLLED BY THE MEASURED SIGNAL
Filed March 4, 1963

INVENTOR
Hugo S. Ferguson
BY
ATTORNEYS

United States Patent Office 3,289,079
Patented Nov. 29, 1966

3,289,079
R.M.S. MEASURING SYSTEM HAVING AN INTEGRATING CIRCUIT INCLUDING A TRANSISTORIZED CAPACITOR DISCHARGE MEANS CONTROLLED BY THE MEASURED SIGNAL
Hugo S. Ferguson, Averill Park, N.Y., assignor to Duffers Associates, Inc., Wynantskill, N.Y., a corporation of New York
Filed Mar. 4, 1963, Ser. No. 262,565
5 Claims. (Cl. 324—103)

This invention relates to electric meters, and particularly to root-mean-square (R.M.S.) meters. The invention is especially directed to the measurement of currents used in welding operations, although not confined thereto.

In resistance welders it is common to employ 60 c./s. single-phase current which may be sinusoidal or nearly sinusoidal at full heat setting, but is pulsating at lower heat settings. Large currents of the order of thousands of amperes may be involved, and are commonly obtained from the secondary of a transformer. For proper control of the welding operation it is important to know the heating value of the current applied. Also, if the duty cycle of the pulses is varied during a weld, it is important to know the heating value of the largest pulse. While these values may be determined by recording the current waveforms and determining the heating value from the peak value, waveshape and duration, it is far preferable to have a meter capable of directly indicating the R.M.S. values.

In U.S. application Serial No. 83,232, filed January 17, 1961, by Hugo S. Ferguson for "Electric Meters," now Patent No. 3,201,688 issued August 17, 1965, a meter is described which is particularly adapted for indicating the R.M.S. value of welding currents with satisfactory accuracy throughout the range of heat settings commonly employed. Further, in welders wherein the length of the current pulses varies during the welding operation the meter is capable of giving an accurate R.M.S. value of the pulses of maximum heating value.

In the specific embodiment described in the aforesaid patent, A.-C. voltage pulses corresponding to the welding current pulses are applied to a resistance-capacitance integrating circuit, and means are provided for halting the charging of the capacitance when the integrated signal thereon becomes substantially equal to the instantaneous value of the trailing edge of the respective pulse and for discharging the capacitance prior to the integration of a succeeding pulse. As specifically described, a discharge transistor is employed which has its emitter-collector circuit connected across the integrating capacitor and its base connected to the A.-C. pulse source. When the base and emitter reach substantially the same potential, the transistor conducts and discharges the capacitor.

For accurate results, it is necessary to completely discharge the integrating capacitor after the integration of one pulse and prior to the integration of the next pulse. In the circuit there described, it was found difficult to discharge the capacitor sufficiently fast under certain operating conditions, such as at full heat setting when half-sinusoidal pulses follow each other with no gap therebetween. Accordingly, two integrating circuits were arranged to operate alternately and the outputs combined. In this manner, each integrating capacitor had at least a half-cycle in which to discharge.

The present invention is an improvement on the discharge circuit of the aforesaid application and provides a circuit capable of completing the discharge of the integrating capacitor by the end of the corresponding A.-C. pulse, ready for the integration of the next A.-C. pulse.

Thus a single integrating circuit suffices. In this manner balancing problems are avoided, which greatly facilitates manufacture and testing, long-term stability with freedom from calibration problems is obtained, and in general a very satisfactory R.M.S. integrating circuit is provided.

Figure 2:
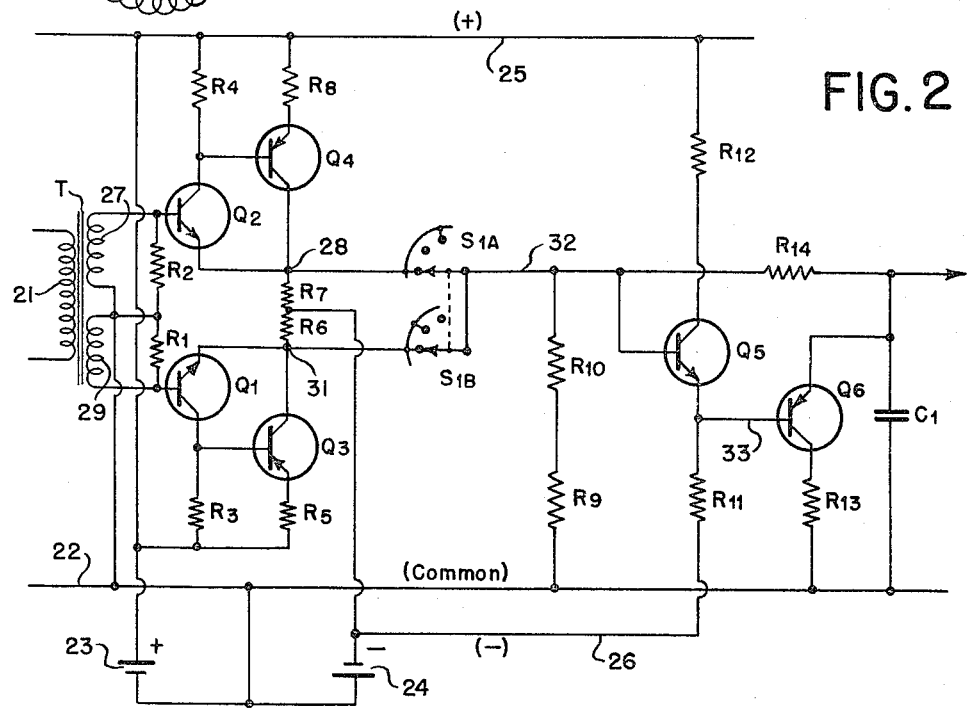
Figure 3:
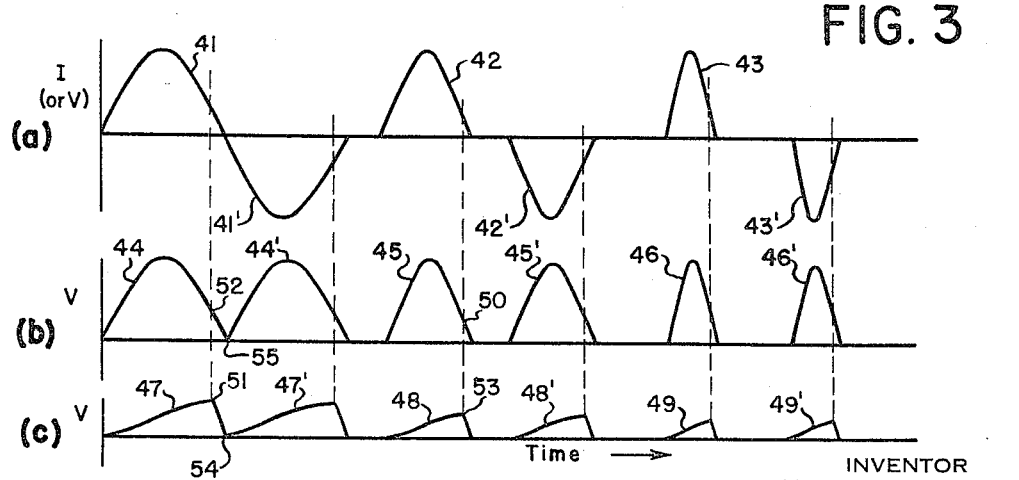

The invention will be described in connection with a specific embodiment thereof wherein further features and advantages will in part be pointed out and in part be recognized by those skilled in the art. In the drawings:

FIG. 1 is an overall block diagram of the meter;
FIG. 2 is a circuit diagram of the R.M.S. detector circuits incorporating the present invention; and
FIG. 3 shows illustrative waveforms for the circuit of FIG. 2.

Referring to FIG. 1, this is the same as FIG. 1 of the aforesaid application. A pickup of suitable design is employed, here shown as a toroid coil 10. The toroid coil, in use, is placed around the current carrying conductor, for example the arm of a welding machine. In FIG. 1, the cross-section of such a conductor is indicated at 11. The voltage induced in toroid coil 10 is proportional to the rate of change or differential of the current in conductor 11. Therefore the toroid signal output is integrated in integrator 12 to produce a signal wave proportional to the current flowing in conductor 11 and of the same waveform. This signal is then supplied to R.M.S. detector circuits 13 to obtain corresponding R.M.S. current values. These are supplied to a peak indicating circuit 14 and thence to indicator 15. Suitable arrangements for the toroid coil 10, integrator 12, peak indicating circuit 14 and meter 15 are described in the aforesaid application.

Referring to FIG. 2, rectifier and R.M.S. detector circuits are shown in accordance with the present invention. As explained in the above-identified application, in some uses it is possible for the input signal to consist of only one or a few A.-C. pulses of either polarity, or the pulses may be of different R.M.S. value with a maximum of either polarity. It is thus desirable for the meter to be able to measure R.M.S. values of either positive or negative A.-C. pulses, or both. Accordingly, the input signal is supplied to a rectifier circuit switchable to function as a full-wave rectifier, or as a half-wave rectifier on A.-C. pulses of either polarity.

Diode rectifiers could be employed, as described in the above-identified application. However, in order to obtain better impedance-matching and freedom from balancing problems, in FIG. 2 pairs of transistors are employed instead. Transistors of both PNP and NPN types are employed in the circuit of FIG. 2. When the arrow of the emitter points toward the base, as in Q4, a PNP type is indicated. When the arrow points away from the base, as in Q2, an NPN type is indicated. As will be understood, the types employed depend upon the detailed circuit design.

The output of integrator 12 of FIG. 1 is supplied to the primary 21 of transformer T having a center-tapped secondary. The center tap is connected to a common return line 22. This may be conveniently considered to be at ground potential, although it may not actually be grounded to the case of the instrument in practice. Power supplies of opposite polarity, here shown as batteries 23 and 24, provide corresponding positive and negative potentials to lines 25 and 26.

Resistors R1 and R2 are connected across respective halves 27, 29 of the center-tapped secondary so as to provide a more constant load on the transformer during the rectifying action. The pair of transistors Q2 and Q4 function during positive portions of the applied signal and transistors Q1 and Q3 during the negative portions. The circuits are similar to that only the upper circuit will be described in detail.

Transistors Q2 and Q4 are connected as a feedback amplifier having a voltage gain of approximately unity (theoretically very slightly less than unity) but providing substantial current gain. The input signals from the upper half 27 of the transformer secondary are applied to the base of Q2 and the collector thereof is connected through a load resistor R4 to the positive supply line 25. The collector of Q2 is conected to the base of Q4, and the emitter of Q4 is connected through resistor R8 to the supply line 25. The emitter of Q2 and collector of Q4 are connected together and through a load resistor R7 to the negative power supply line 26.

When the upper end of secondary 27 is positive to the common line 22 (ground), Q2 conducts and the base of Q4 is driven negative to its emitter causing Q4 to conduct. With the collector of Q4 directly connected to the emitter of Q2, the resultant feedback produces an overall voltage gain of approximately unity. With a large gain in the individual transistor stages, say 50, the feedback makes the circuit uncritical with respect to component values, thereby avoiding balancing problems between upper and lower halves of the rectifier circuit. Due to the unity gain, the voltage at point 28 is substantially the same as that at the upper end of transformer secondary 27 during a positive excursion.

The lower portion of the circuit including transistors Q1 and Q3 conducts when the lower end of transformer secondary 29 is positive, delivering a corresponding positive voltage to point 31.

Points 28 and 31 are connectible through ganged switch sections S1A and S1B to a common output line 32. In the position shown, the outputs of both sections are supplied to the line 32 so that the circuit functions as a full-wave rectifier. By moving the switch sections to one or the other of the remaining positions, output pulses will be delivered to line 32 representing either positive or negative portions of the input signal in transformer primary 21.

The values of load resistors R6 and R7 are advantageously chosen to be high compared to the external load connected to line 32. Without the external load, Q2, Q4 can function substantially as a Class A amplifier, so that the potential at point 28 could go in both positive and negative directions with respect to ground. However, with an external load which is small compared to R7, the amplifier functions essentially in Class B so that the potential of point 28 can go only slightly negative to ground. As will subsequently be developed, it is important to avoid an initial negative potential on the integrating capacitor C1, and this is facilitated by avoiding the application of a substantial negative voltage thereto. When only upper or lower rectifier sections are operating in corresponding positions of the switch, the low external load avoids such a negative voltage in line 32. When both outputs are connected together, positive current flow from one rectifying circuit would overcome any negative flow from the other, so that line 32 would not go negative. However the low external impedance reduces the amount of such counteraction.

As will be explained hereinafter, the RMS circuit is designed to prevent any residual negative voltage in line 32 from adversely affecting the operation.

Resistors R9 and R10 are connected from line 32 to the common line 22 and, together with R14 and C1, function as a load circuit of the desired impedance.

FIG. 3(a) shows representative types of waveforms which may be applied to the transformer primary 21 under different operating conditions of a resistance welding apparatus. The waveforms may be considered to be the welding current, or the corresponding voltages applied to the transformer primary 21.

At the left is shown a single cycle of 60-cycle alternating current having a positive half-cycle 41 and a negative half cycle 41'. This corresponds to adjustment of the welder for maximum heat. The waveform may continue for additional cycles depending upon the welding operation. The waveforms shown at 42 and 42' are positive and negative current pulses of lower duty cycle corresponding to a setting of the welder for a medium degree of heat. Pulses 43 and 43' show pulses corresponding to a still lower degree of heat. In some welding operations the duty cycle may be constant during the making of a weld, and in others it may vary during a weld, usually increasing. Also, the peak amplitudes may vary.

These pulses are the same as those shown in the above-mentioned application and are described more in detail therein. They are here termed "A.-C. pulses," it being understood that the positive and negative halves of a sine wave, such as shown at 41, 41', are included within this terminology.

FIG. 3(b) shown the corresponding rectified pulses which would be applied to line 32 in the switch positions shown. A.-C. pulse 44 corresponds to the positive excursion 41 of the input sine wave and A.-C. pulse 44' corresponds to the negative excursion 41'. Similarly, pulses 45 and 45' correspond to input pulses 42, 42', and pulses 46, 46' correspond to input pulses 43, 43'.

The pulses in line 32 are delivered to an integrating circuit comprising resistor R14 and capacitor C1. During the leading edge of each pulse in FIG. 3(b), and for a portion of the trailing edge thereof, capacitor C1 is charging. When the voltage across the capacitor equals the instantaneous value of the pulse applied to the integrating circuit, the charging of the capacitor is halted and the capacitor discharged. The voltage pulses appearing across C1 are shown in FIG. 3(c). Pulses 47, 47' correspond to 44, 44', pulses 48, 48' correspond to 45, 45', and pulses 49, 49' correspond to 46, 46'. The peak voltage of pulse 47, indicated as 51, is the same as the instantaneous voltage 52 on the trailing edge of the pulse 44; the peak voltage 53 of pulse 48 is the same as the instantaneous voltage 50 on the trailing edge of pulse 45, and similarly for the other pulses.

As explained in the above-identified application, when the constants of the integrating circuit are properly selected, this procedure results in the peak values of the pulses in FIG. 3(c) corresponding to the R.M.S. values of the corresponding A.-C. pulses of FIG. 3(b).

In order for the integrated signal to accurately represent the R.M.S. value of a given A.-C pulse, it is necessary for the capacitor C1 to be completely discharged prior to each integration. Thus, in the case of A.-C. pulses which repeat without an interval therebetween, as in the case of pulses 44 and 44', C1 must be completely discharged at point 54, corresponding to point 55, so that integration of the succeeding pulse 44' can proceed immediately. In the case of pulses 45, 45' and 46, 46' the problem is less severe since there is an interval of time available before the subsequent integration begins.

The rapid discharge of C1 is obtained through the circuits including transistors Q5 and Q6. These transistors are of opposite polarity types, and advantageously are complementary, that is, they have similar characteristics except for the difference in polarity. Q5 may be termed the control transistor and is connected as essentially an emitter follower, with the base connected directly to the input line 32 and the emitter connected through load R11 to the negative power supply. The emitter of Q5 is direct-connected to the base of Q6. Q6 also functions substantially as an emitter follower, with C1 being the emitter load. Resistors R12 and R13 are small resistors in the collector circuits of respective transistors Q5 and Q6 to provide protection from any transient spikes that may occur, and do not appreciably affect the emitter follower action.

During the leading portions of an applied A.-C. pulse, the base of Q5 is positive to its emitter, and the transistor is in its conductive condition. Accordingly, the potential of line 33 is substantially that of line 32. During the charging of C1 there will always be a voltage drop across R14, and consequently the potential of the emitter of Q6 will be negative with respect to its base, which is connected to line 33. Therefore Q6 will be cut off. With a reasonable current gain in Q5, only a very small current is required from line 32 so that excessive loading is avoided.

During the trailing portion of a given pulse, the voltage in line 32 is decreasing, and the potential of the base and emitter of Q5 will decrease. At some point during the trailing portion, the potential of line 33 will go below the potential across C1, and Q6 will become conductive. In practice, there is always a small diode junction voltage drop across the base-emitter circuit of a transistor. In the arrangement shown, using complementary transistors for Q5 and Q6, the voltage drops across the base-emitter circuits of the two transistors will be substantially equal but in opposite directions and will essentially cancel. Accordingly Q6 will start to conduct when the voltage across C1 is substantially equal to the voltage in line 32 on the trailing edge of a pulse. The current necessary to operate Q6 is supplied through R11.

During the discharge, the negative bias for the base of Q6 insures that the transistor will be highly conductive even though the voltage across C1 approaches zero. Transistor Q6, R11 and the negative supply in line 26 are selected so that the transistor is capable of discharging C1 at a rate at least equal to the maximum rate of change of an applied A.-C. pulse, and preferably considerably greater. Since the available discharge rate of Q6 will then exceed the slope of the input signal pulse, control transistor Q5 will ordinarily not be fully cut off during the discharge action. In other words, Q6 discharges C1 at a rate rapid enough to keep up with the decreasing signal at the base of Q5.

Overall, when the trailing edge of a pulse in line 32 reaches zero potential, the capacitor C1 will be completely discharged and ready for another integration. At this point the base of Q5 and emitter of Q6 will both be at substantially zero potential, whereas the emitter of Q5 and base of Q6 will be slightly negative due to the base-emitter voltage drops therein, so that Q6 will remain substantially a short-circuit across C1.

As before described, under some operating conditions line 32 may become somewhat negative during the interval between A.-C. pulses. It is important that C1 not become negatively charged in such case, since this would affect the accuracy of the integration of the next pulse. Due to the diode junction between the collector and base of Q6, the potential of the base cannot become negative to ground by more than a small fraction of a volt, say 0.2 volt. It is undesirable that even such a small negative potential exists on C1. In the arrangement shown, the negative potential on the base of Q6 maintains the emitter collector circuit substantially a short circuit across C1, so that C1 cannot become charged appreciably negative.

As an aid to the ready practice of the invention, in one specific embodiment of the invention which has been operated with success the following component values were employed. It will be understood that these are given for illustrative purposes only, and that the invention is not confined thereto.

R1, R2=33K (kilohms)
R3, R4=2.2K
R5, R8, R12=100 ohms
R6, R7=47K
R9=6.8K
R10=2.5K
R11=22K
R13=10 ohms
R14=4.16K
C1=1.0 mfd.

Battery 23=+9 volts
Battery 24=−9 volts
Q1, Q2, Q5=2N1304 (NPN)
Q3, Q4, Q6=2N1305 (PNP)

The circuit was designed for use with peak A.-C. pulses of the order of 4 to 5 volts and for 60-cycle operation. The available discharge rate for the circuit including Q6 can be calculated using the above values, and assuming the emitter of Q5 is disconnected from line 33. Assuming a small potential on C1, say ½ volt, the emitter-base current of Q6 can be calculated. Then, assuming a current gain of, say 50, the emitter-collector circuit can be calculated. With the value of C1 given, it can be calculated that approximately 23 microseconds are required for the ½ volt on C1 to discharge to zero. This is a discharge rate of 21,800 volts/second. For a 60-cycle sine wave of 5 volts peak amplitude, the maximum rate of change of voltage (near zero) is approximately 1860 volts/second. Hence the available discharge rate far exceeds that required.

In the specific embodiment C1 is charged in the positive direction. In the event that it is desired to charge in the negative direction, the transistor polarity types will be interchanged, as will be understood by those skilled in the art.

As will be understood from the discussion of FIG. 1, the R.M.S. pulses developed across capacitor C1 may be supplied to a peak reading circuit of suitable type so that the maximum R.M.S. pulse value may be indicated.

The invention has been described in connection with a preferred embodiment thereof. It will be understood that modification may be made therein within the spirit and scope of the invention.

I claim:

1. In a meter for indicating the R.M.S. value of A.-C. pulses including a resistance-capacitance integrating circuit, means for supplying A.-C. pulses to said integrating circuit to charge said capacitance, discharge means for halting charging of the said capacitance when the integrated signal thereon becomes substantially equal to the instantaneous value of the trailing edge of the respective pulse and discharging the capacitance prior to the integration of a succeeding pulse, and indicating means responsive to said integrated signal, the improvement in said discharge means which comprises
    (a) a discharge transistor having the emitter-collector circuit thereof connected across said capacitance,
    (b) a control transistor having the base thereof connected to receive said A.-C. pulses and the emitter thereof direct-connected to the base of the discharge transistor,
    (c) and means for biasing said direct-connected emitter and base through a load impedance to a potential of opposite polarity to the potential across said capacitance during the charging thereof,
    (d) said discharge and control transistors being of opposite polarity types with the control transistor conducting and the discharge transistor non-conducting during the charging of said capacitance.

2. In a meter for indicating the R.M.S. value of A.-C. pulses including a resistance-capacitance integrating circuit, means for supplying A.-C. pulses to said integrating circuit to charge said capacitance, discharge means for halting charging of said capacitance when the integrated signal thereon becomes substantially equal to the instantaneous value of the trailing edge of the respective pulse and discharging the capacitance prior to the integration of a succeeding pulse, and indicating means responsive to said integrated signal, the improvement in said discharge means which comprises
    (a) a discharge transistor having the emitter thereof connected to the input side of said capacitance and the collector thereof connected to the other side of the capacitance, (b) a control transistor having the base thereof connected to receive said A.-C. pulses and the emitter thereof connected to the base of the discharge transistor, (c) means for biasing the emitter of the control transistor and base of the discharge transistor through a load impedance to a potential opposite in polarity to the potential across said capacitance during the charging thereof, (d) said control and discharge transistors being of opposite polarity types with the control transistor conducting and the discharge transistor non-conducting during the charging of said capacitance.

3. In a meter for indicating the R.M.S. value of A.-C. pulses including a resistance-capacitance integrating circuit, means for supplying A.-C. pulses to said integrating circuit to charge said capacitance, discharge means for halting charging of said capacitance when the integrated signal thereon becomes substantially equal to the instantaneous value of the trailing edge of the respective pulse and discharging the capacitance prior to the integration of a succeeding pulse, and indicating means responsive to said integrated signal, the improvement in said discharge means which comprises (a) a discharge transistor connected as substantially an emitter follower with the emitter thereof connected to the input side of said capacitance and the collector thereof connected to the other side of the capacitance, (b) a control transistor connected as substantially an emitter follower with the base thereof direct-connected to receive the A.-C. pulses applied to said integrating circuit and the emitter thereof direct-connected to the base of the discharge transistor, (c) and a load resistance connected between said direct-connected emitter and base and a bias source of opposite polarity to the potential of the input side of said capacitance during the charging thereof, (d) said control and discharge transistors being of opposite polarity types with the control transistor conducting and the discharge transistor non-conducting during the charging of said capacitance.

4. Apparatus in accordance with claim 3 in which said load resistance and bias source are predetermined to yield an available rate of discharge of said capacitance substantially exceeding the maximum rate of change of the trailing edges of the A.-C. pulses applied to said integrating circuit.

5. Apparatus in accordance with claim 4 in which the control and discharge transistors are of complementary types having similar characteristics but of opposite polarity.

References Cited by the Examiner

UNITED STATES PATENTS 3,105,160  9/1963  Adler _____ 307—88.5
3,201,688  8/1965  Ferguson _____ 324—103

WALTER L. CARLSON, *Primary Examiner.*

RUDOLPH V. ROLINEC, *Examiner.*

J. J. MULROONEY, *Assistant Examiner.*